(12) United States Patent
Bodum

(10) Patent No.: US 8,727,177 B2
(45) Date of Patent: May 20, 2014

(54) GRINDER CONTAINER

(75) Inventor: Jorgen Bodum, Meggen (CH)

(73) Assignee: Pi-Design AG, Triengen (CH)

( * ) Notice: Subject to any disclaimer, the term of this patent is extended or adjusted under 35 U.S.C. 154(b) by 0 days.

(21) Appl. No.: 13/387,008

(22) PCT Filed: Feb. 11, 2010

(86) PCT No.: PCT/CH2010/000038
§ 371 (c)(1),
(2), (4) Date: Jan. 25, 2012

(87) PCT Pub. No.: WO2010/048737
PCT Pub. Date: May 6, 2010

(65) Prior Publication Data
US 2012/0125928 A1 May 24, 2012

(30) Foreign Application Priority Data
Aug. 12, 2009 (CH) ..................................... 1250/09

(51) Int. Cl.
*B65D 43/00* (2006.01)
*B65D 43/02* (2006.01)
*B65D 43/04* (2006.01)
*B65D 43/08* (2006.01)

(52) U.S. Cl.
USPC ........... 220/804; 220/796; 220/797; 220/798; 220/801; 220/802; 220/803; 220/806

(58) Field of Classification Search
USPC ......... 220/200, 378, 796, 797, 798, 801, 802, 220/803, 804, 806; 206/524.6
See application file for complete search history.

(56) References Cited

U.S. PATENT DOCUMENTS

| 3,221,997 | A |   | 12/1965 | Smit |   |
|---|---|---|---|---|---|
| 5,957,323 | A | * | 9/1999 | Terracciano et al. | 220/574 |
| 7,097,067 | B2 | * | 8/2006 | Scarabelli et al. | 220/796 |
| 2007/0095849 | A1 | * | 5/2007 | Kim | 220/803 |

FOREIGN PATENT DOCUMENTS

DE   1607526 B1   1/1972

\* cited by examiner

*Primary Examiner* — Anthony Stashick
*Assistant Examiner* — Madison L Poos
(74) *Attorney, Agent, or Firm* — Sughrue Mion, PLLC

(57) ABSTRACT

A grinder container (10) to be inserted in a coffee grinder comprises a lid (20) having a center inlet hole (26). The lid (20) rests on an opening rim (18) of the grinder container (10) with a peripheral lid rim (21). A peripheral web (30) projects into the interior of the grinder container (10) at a distance to the peripheral lid rim (21) and is opposite an inner wall (X) of the grinder container (10). In order to level out any dimensional tolerances regarding the height of grinder containers, the lid (20) consists of a deformation-resistant center lid part (24) which is produced of a rigid plastic material and comprises the center inlet hole (26) and of an elastically deformable lid part (22) which is produced of a soft rubber material, said lid part being connected to the center lid part (24) and comprising the peripheral web (30).

7 Claims, 3 Drawing Sheets

GRINDER CONTAINER

CROSS REFERENCE TO RELATED APPLICATIONS

This application is a National Stage of International Application No. PCT/CH2010/000038 filed Feb. 11, 2010, claiming priority based on Swiss Patent Application No. 01250/09, filed Aug. 12, 2009, the contents of all of which are incorporated herein by reference in their entirety.

TECHNICAL FIELD

The present invention relates to a grinder container for insertion into a coffee grinder, having a lid which has a central introduction opening, rests on an opening rim of the grinder container by way of a peripheral lid rim and from which, at a distance from the peripheral lid rim, a circumferential web projects into the interior of the grinder container and is located opposite the inside of a wall of the grinder container.

PRIOR ART

It is the case with many conventional coffee grinders having a grinder container made of plastics material that the coffee powder is charged electrostatically, which often results in the undesired diversion of adhering coffee powder in subsequent operations and, as a consequence, in contaminations. This effect can be vastly reduced if use is made of grinder containers made of glass or metal.

However, grinder containers made of glass have a relatively large dimensional tolerance in respect of height, and therefore a gap has to be expected between the grinder container and coffee grinder. Coffee powder can escape out of this gap, which, in turn, results in the undesired diversion of coffee powder outside the container.

SUMMARY OF THE INVENTION

It is an object of the present invention to create a lid which is suitable for a grinder container of the type mentioned in the introduction, can compensate for relatively large dimensional tolerances in respect of the height of grinder containers and—once inserted in a coffee grinder—ensures a sealed connection between the coffee grinder and lid in the region of the introduction opening in the lid.

The object is achieved according to the invention in that the lid, in order to compensate for dimensional tolerances in the height of grinder containers, comprises a deformation-resistant, central lid part, produced from a hard plastics material, and an elastically deformable lid-rim part which is connected to the central lid part, comprises the circumferential web and is made of a soft rubber material.

The grinder container is generally cylindrical with a circular opening rim, but other container cross sections are also conceivable.

For better sealing between the lid and grinder container, a circumferential sealing lip, which is directed toward the inside of the wall of the grinder container, can project from the free end of the circumferential web.

In a preferred embodiment, the lid-rim part and the central lid part are connected via a groove/tongue connection, wherein the groove/tongue connection is expediently formed by virtue of the central lid part being insert-molded with the soft rubber material of the lid-rim part by injection molding. Another possibility is for the groove/tongue connection to be adhesively bonded.

The grinder container preferably consists of glass, in particular of borosilicate glass.

BRIEF DESCRIPTION OF THE DRAWINGS

Preferred embodiments of the invention will be described hereinbelow with reference to the drawings, which serve merely for explanatory purposes and should not be interpreted as being restrictive. In the drawings.

DESCRIPTION OF PREFERRED EMBODIMENTS

Figure 2:
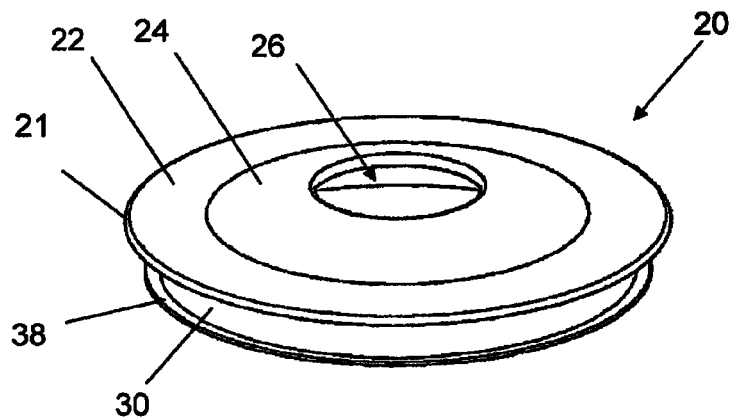
FIG. 2 shows an oblique view from above of the lid of the grinder container from FIG. 1.
Figure 1:
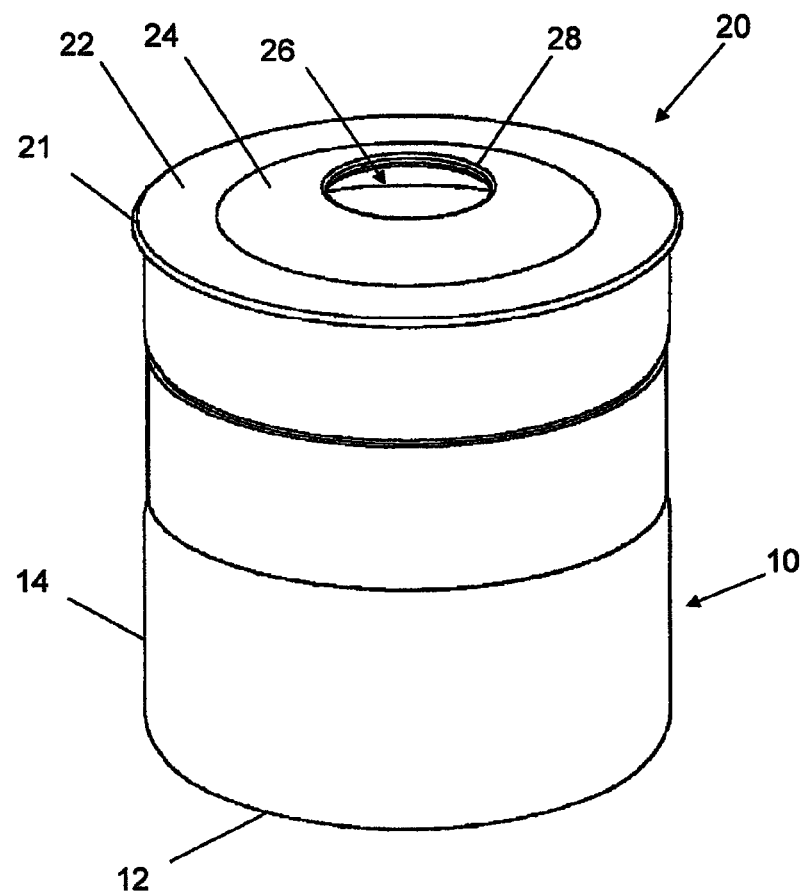
FIG. 1 shows an oblique view from above of a grinder container with its lid placed in position.
Figure 3:
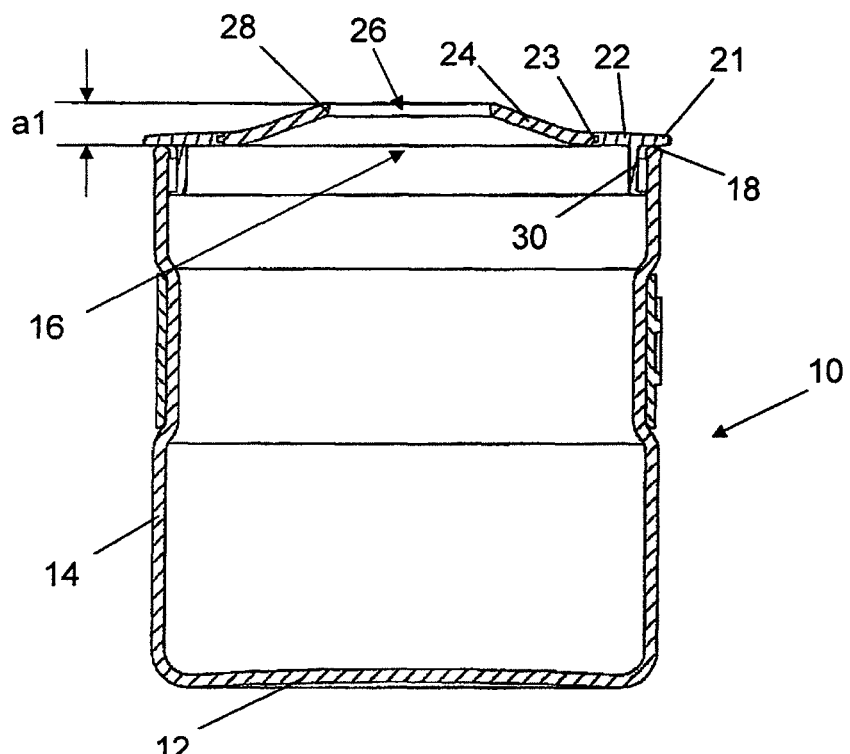
FIG. 3 shows a longitudinal section through the grinder container from FIG. 1.

A grinder container 10, which is illustrated in FIGS. 1 to 3, comprises a base 12 and a substantially cylindrical container wall 14 which projects up from the base 12 and has an opening rim 18 terminating the container wall 14 and bounding a container opening 16.

A lid 20, which is placed in position on the grinder container 10, is made in two parts and comprises a central lid part 24, with a central introduction opening 26 bounded by an opening rim 28, and a lid-rim part 22, which follows the central lid part 24, is connected thereto via a possibly adhesively bonded groove/tongue connection 23, rests on the opening rim 18 of the container wall 14 by way of a peripheral lid rim 21 and projects laterally beyond this container wall to a slight extent. At a distance from the peripheral lid rim 21, a circumferential web 30 projects substantially vertically inward from the lid-rim part 22 and is located opposite the cylindrical wall 14 of the grinder container 10, at a short distance therefrom, in the region of the container opening 16. The central lid part 24 is deformation-resistant and consists of a hard plastics material. The lid-rim part 22 with the circumferential web 30 consists of an elastic, soft rubber material.

The central lid part 24 has a curvature which begins in the region of the transition from the lid-rim part 22 to the central lid part 24 and ends at the rim 28 of the introduction opening 26. In the non-loaded state, the rim 28 of the introduction opening 26 projects beyond the rim 18 of the container opening 16 by an extent a1.

Figure 4:
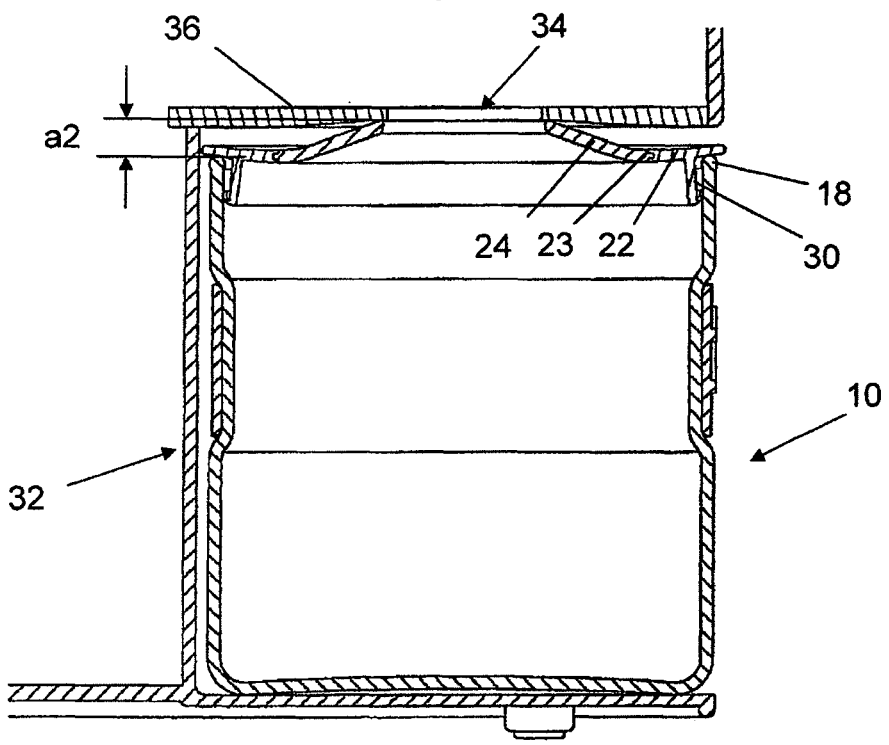
FIG. 4 shows a longitudinal section through the grinder container from FIG. 1 inserted into a coffee grinder.
Figure 5:
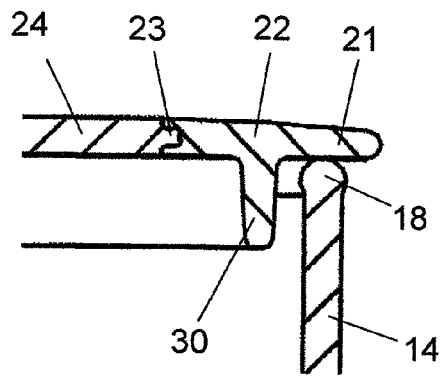
FIG. 5 shows an enlarged detail of a first embodiment of a lid in the non-loaded state according to FIG. 3.
Figure 6:
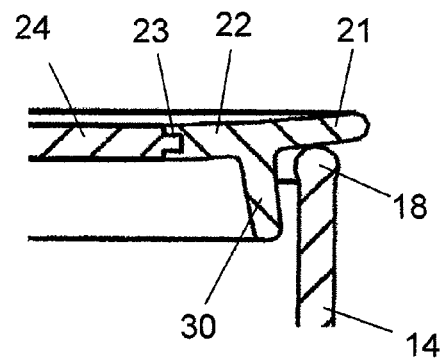
FIG. 6 shows the enlarged detail from FIG. 5 in the loaded state according to FIG. 4.

As shown in FIG. 4, when the grinder container 10 with lid 20 placed in position thereon is inserted into an accommodating part 32 of a coffee grinder (not illustrated specifically), the central lid part 24 with the central introduction opening 26 is covered over by a plate 36, which is provided with an outlet opening 34 for ground coffee, such that the outlet opening 34 and the central introduction opening 26 are located one above the other, while the plate 36, at the same time, presses the central lid part 24 downward onto the grinder container 10. Depending on the height of the grinder container 10 within predetermined tolerance limits, the extent a1—the vertical distance between the rim 28 of the introduction opening 26 of the central lid part 24 and the rim 18 of the grinder container 10—decreases to a smaller extent a2, corresponding to a height of the grinder container 10 which is above the lower tolerance limit value. The force which acts on the lid part 24 here is transmitted to the lid-rim part 22, wherein the latter rests on the opening rim 18 of the grinder container 10 in a force-fitting and sealing manner at all times. The fact that the peripheral lid rim 21 rests on the opening rim 18 of the grinder container 10 means that the lid-rim part 22 transfers from a non-loaded, horizontal position (FIG. 5) into an inclined position, in which it is directed slightly toward the container interior, wherein the free end of the circumferential web 30 moves toward the inside of the cylindrical wall 14 of the grinder container 10 (FIG. 6).

Figure 7:
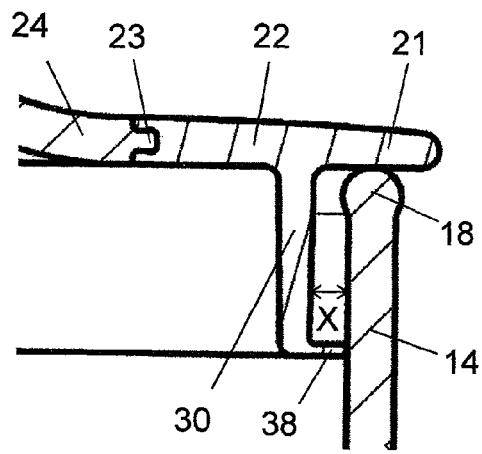
FIG. 7 shows an enlarged detail of a second embodiment of a lid in the non-loaded state according to FIG. 3.
Figure 8:
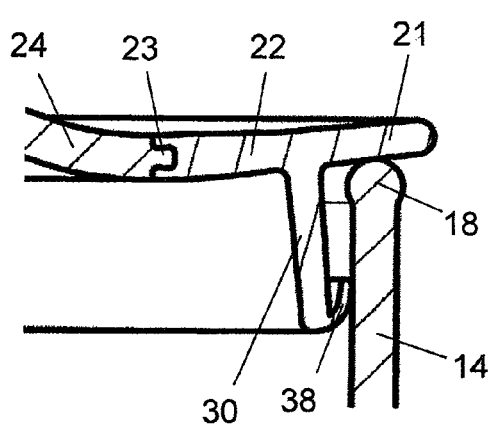
FIG. 8 shows the enlarged detail from FIG. 7 in the loaded state according to FIG. 4.

In the case of a variant of a lid 20 which is shown in FIGS. 7 and 8, a sealing lip 38 projects substantially horizontally outward from the free end of the circumferential web 30 and, in the non-loaded state (FIG. 7), has its free end in contact with the inside of the wall 14 of the grinder container 10. This results, in addition, in the lid 20 being centered, and stabilized in position, on the grinder container 10.

The accommodating part 32 with the plate 36 of the coffee grinder and the grinder container 10 with its lid 20 placed in position are coordinated with one another such that with the grinder container 10 inserted in the coffee grinder, and with the grinder container 10 being of a height corresponding to the lower tolerance limit value, the lid 20 is subjected to loading by a force which is precisely sufficient for the plate 36 to rest in a sealed manner on the lid 20.

Once the grinder container 10 has been inserted in a coffee grinder, then the free end of the web 30, in the loaded state of the lid 20, is moved toward the inside of the cylindrical wall 14 of the grinder container 10. This means that the sealing lip 38 is deformed and pressed into a gap X formed by the web 30 and the container wall 14, and this gives rise to a further-improved seal between the lid 20 and grinder container 10.

LIST OF DESIGNATIONS

10 Grinder container
12 Base
14 Container wall
16 Container opening
18 Opening rim of 16
20 Lid
21 Peripheral lid rim
22 Lid-rim part
23 Groove/tongue connection
24 Lid part
26 Introduction opening
28 Opening rim of 26
30 Circumferential web
32 Accommodating part
34 Outlet opening in 34
36 Plate
38 Sealing lip on 30
a1, a2 Distance between 18 and 28

The invention claimed is:

1. A combination of a grinder container and a lid, for insertion into a coffee grinder, the combination comprising:
   a grinder container having a base and a container wall having an inside surface, the container wall terminating at an opening rim which bounds a container opening, the grinder container having a height and defining an interior; and
   a lid with a central introduction opening, adapted to ensure a sealed connection between a coffee grinder and the lid in the region of the introduction opening by compensating for dimensional tolerances in the height of the grinder container, the lid comprising:
      a deformation-resistant central lid part, produced from a hard plastics material, in which central lid part the central introduction opening is arranged; and
      an elastically deformable lid-rim part made of a soft rubber material, the lid-rim part being connected to the central lid part, the lid-rim part defining a peripheral lid rim, the lid resting on said opening rim by way of said peripheral lid rim, the lid-rim part comprising a circumferential web projecting from said lid-rim part, at a distance from the peripheral lid rim, into the interior of the grinder container and being located opposite the inside surface of said container wall,
   wherein the central lid part has a curvature which begins in the region of the transition from the lid-rim part to the central lid part and ends at a rim of the introduction opening, such that the rim of the introduction opening projects away from the interior of the grinder container beyond the rim of the container opening.

2. The combination as claimed in claim 1, wherein the lid-rim part further comprises a circumferential sealing lip, which is directed toward the inside surface of the container wall, the sealing lip projecting from a free end of the circumferential web.

3. The combination as claimed in claim 1, wherein the lid-rim part and the central lid part are connected via a groove/tongue connection.

4. The combination as claimed in claim 3, wherein the groove/tongue connection is formed by virtue of the central lid part being insert-molded with the soft rubber material of the lid-rim part.

5. The combination as claimed in claim 3, wherein the groove/tongue connection is adhesively bonded.

6. The combination as claimed in claim 1, wherein the grinder container consists of glass.

7. The combination as claimed in claim 1, wherein the grinder container consists of borosilicate glass.

* * * * *